(12) United States Patent
Shao et al.

(10) Patent No.: US 12,565,380 B2
(45) Date of Patent: Mar. 3, 2026

(54) INDUSTRIAL INTERNET OF THINGS FOR INTELLIGENT THREE-DIMENSIONAL WAREHOUSE, CONTROLLING METHODS AND STORAGE MEDIUM THEREROF

(71) Applicant: CHENGDU QINCHUAN IOT TECHNOLOGY CO., LTD., Chengdu (CN)

(72) Inventors: Zehua Shao, Chengdu (CN); Yaqiang Quan, Chengdu (CN); Yuefei Wu, Chengdu (CN); Yong Li, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 885 days.

(21) Appl. No.: 17/816,432

(22) Filed: Aug. 1, 2022

(65) Prior Publication Data

US 2024/0043214 A1 Feb. 8, 2024

(51) Int. Cl.
*G06N 20/00* (2019.01)
*B65G 1/04* (2006.01)
(Continued)

(52) U.S. Cl.
CPC ......... *B65G 1/1375* (2013.01); *B65G 1/0421* (2013.01); *G06N 20/00* (2019.01); *G16Y 20/10* (2020.01); *G16Y 40/60* (2020.01)

(58) Field of Classification Search
CPC ...... B65G 1/1375; B65G 1/04; B65G 1/1373; B65G 57/03; B65G 1/0421; G06N 20/00;
(Continued)

(56) References Cited

U.S. PATENT DOCUMENTS

| | | | | |
|---|---|---|---|---|
| 8,649,899 B2 * | 2/2014 | Wurman | .............. | G06Q 10/087 |
| | | | | 700/216 |
| 9,008,827 B1 * | 4/2015 | Dwarakanath | .......... | F25B 27/00 |
| | | | | 700/214 |

(Continued)

FOREIGN PATENT DOCUMENTS

CN 114056819 A * 2/2022 ............. B65B 61/26

*Primary Examiner* — Patrick H Mackey

(74) *Attorney, Agent, or Firm* — METIS IP LLC

(57) ABSTRACT

The present disclosure provides an industrial Internet of Things comprising a user platform, a service platform, and a management platform, wherein the management platform is configured to perform the following operations including: in response to receiving a second instruction from the service platform, determining whether a moving force of an automatic stacker satisfies the execution condition, the second instruction is determined by the service platform based on a first instruction sent by the user platform, and the first instruction includes a goods retrieval instruction; controlling the automatic stacker to execute a pick-and-place operation in response to the moving force of the automatic stacker satisfying the execution condition; and in response to the automatic stacker completing the pick-and-place operation, determining a target standby position and controlling the automatic stacker to move to the target standby position.

18 Claims, 6 Drawing Sheets

(51) Int. Cl.
    *B65G 1/137*       (2006.01)
    *G16Y 20/10*       (2020.01)
    *G16Y 40/60*       (2020.01)

(58) Field of Classification Search
    CPC ........ G06N 3/092; G16Y 20/10; G16Y 40/60;
                                 G06Q 10/087
    See application file for complete search history.

(56)               References Cited

U.S. PATENT DOCUMENTS

| | | | |
|---|---|---|---|
| 9,020,682 B2 * | 4/2015 | Shitamoto .......... | B60W 60/0011 |
| | | | 701/1 |
| 9,636,825 B2 * | 5/2017 | Penn ..................... | B25J 9/1697 |
| 11,046,518 B2 * | 6/2021 | Arase .................... | B25J 19/021 |
| 11,661,274 B1 * | 5/2023 | Patel ..................... | B25J 9/0096 |
| | | | 414/278 |
| 12,122,617 B2 * | 10/2024 | Minoo ................. | B65G 47/905 |
| 2021/0182996 A1 * | 6/2021 | Cella .................. | G06Q 10/0631 |
| 2023/0393580 A1 * | 12/2023 | Sawanami ........... | G05D 1/0214 |

* cited by examiner

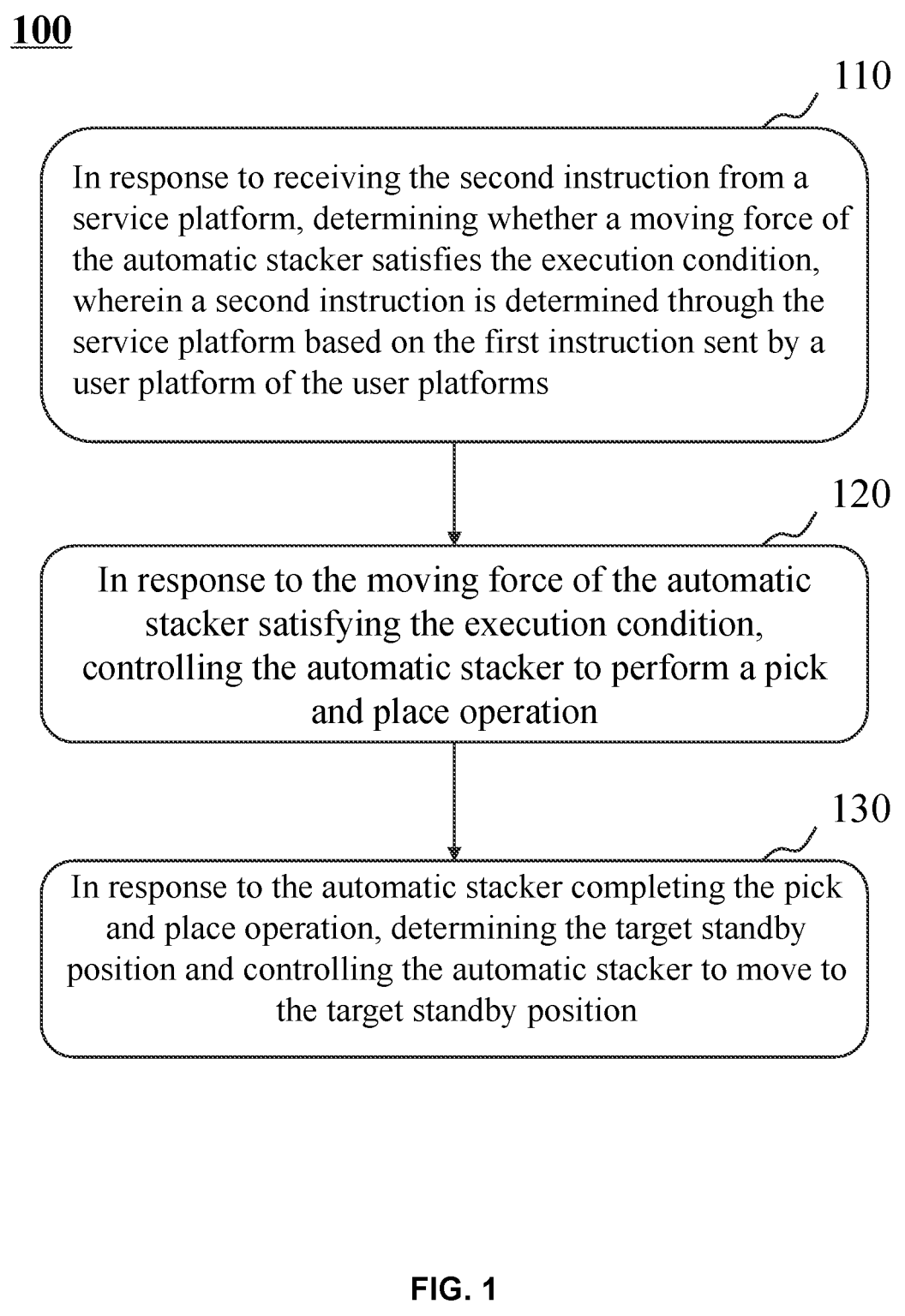

100

110

In response to receiving the second instruction from a service platform, determining whether a moving force of the automatic stacker satisfies the execution condition, wherein a second instruction is determined through the service platform based on the first instruction sent by a user platform of the user platforms

120

In response to the moving force of the automatic stacker satisfying the execution condition, controlling the automatic stacker to perform a pick and place operation

130

In response to the automatic stacker completing the pick and place operation, determining the target standby position and controlling the automatic stacker to move to the target standby position

FIG. 1

200 Functional System
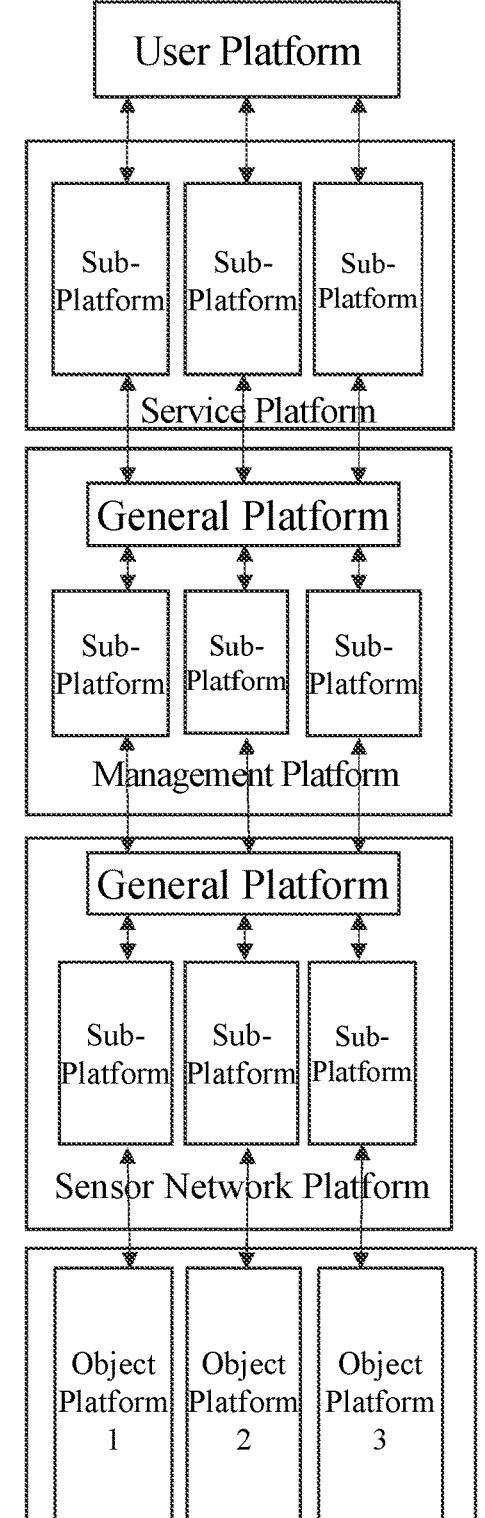
Physical System
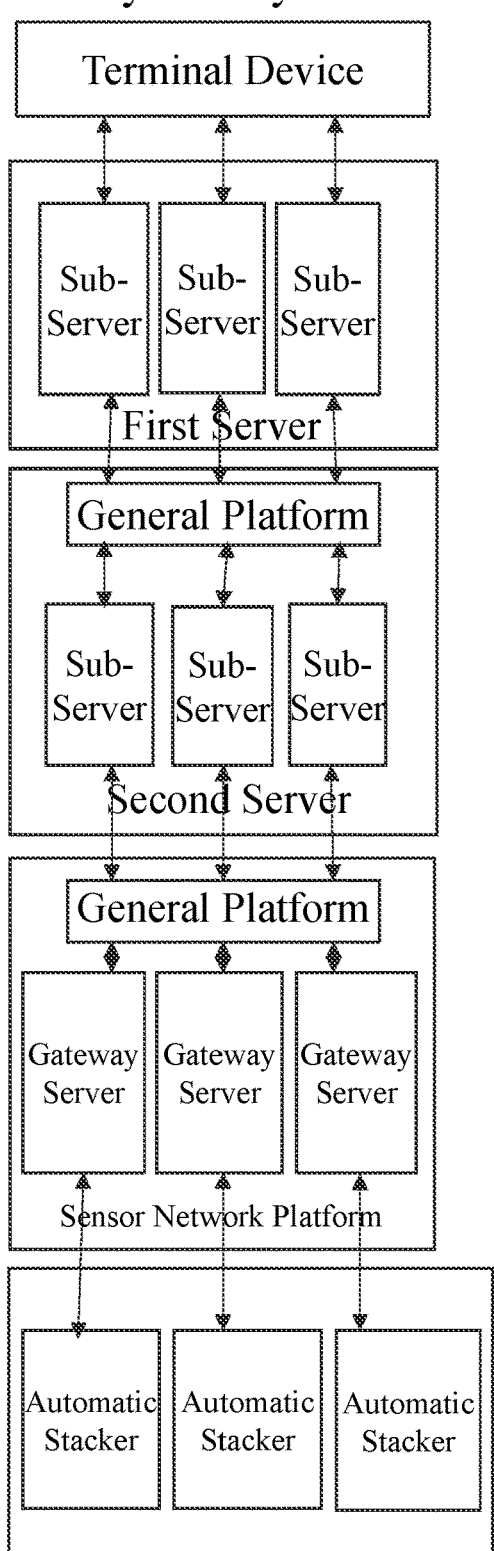
FIG. 2

Figure 3:
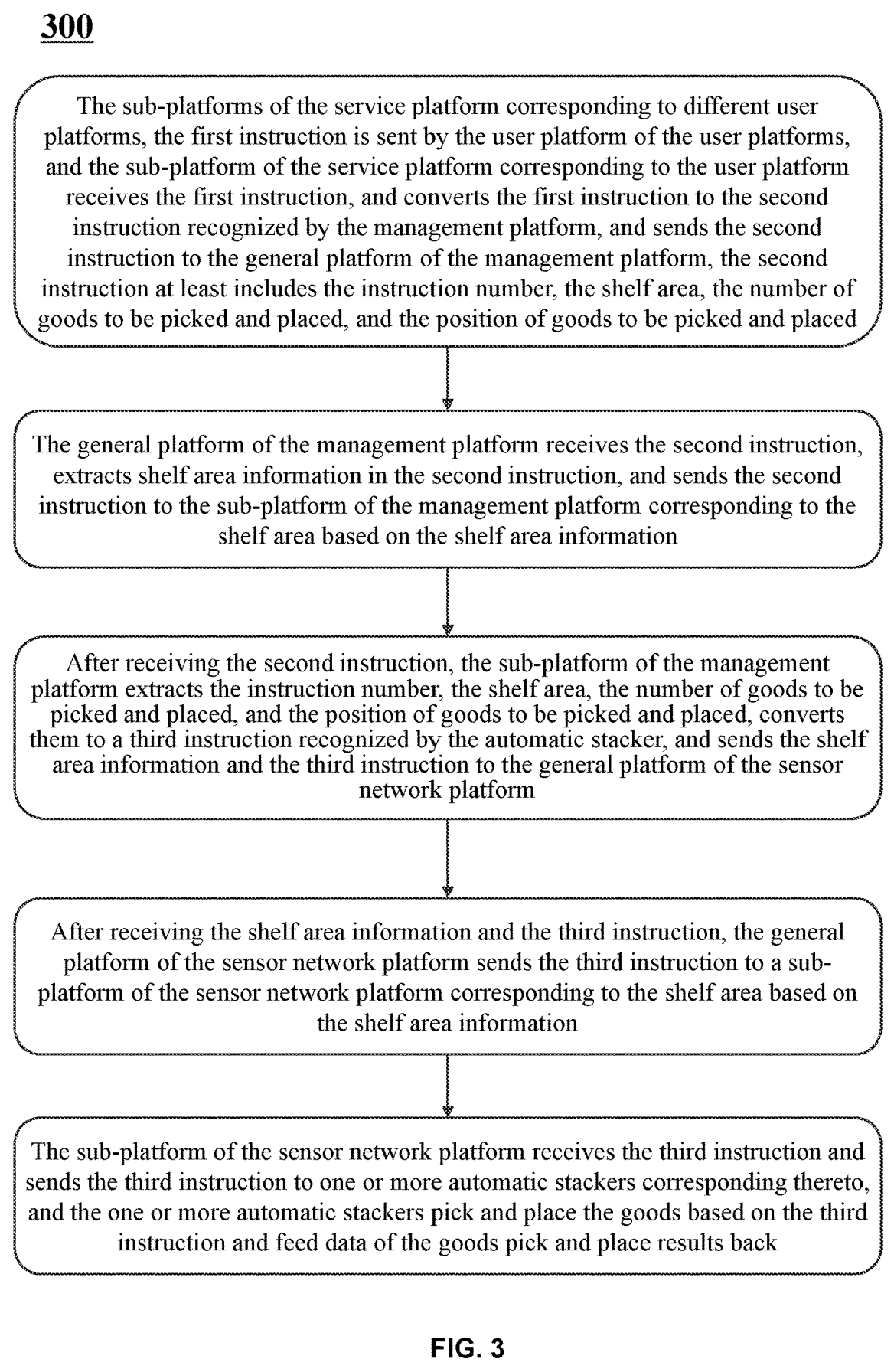

300

The sub-platforms of the service platform corresponding to different user platforms, the first instruction is sent by the user platform of the user platforms, and the sub-platform of the service platform corresponding to the user platform receives the first instruction, and converts the first instruction to the second instruction recognized by the management platform, and sends the second instruction to the general platform of the management platform, the second instruction at least includes the instruction number, the shelf area, the number of goods to be picked and placed, and the position of goods to be picked and placed The general platform of the management platform receives the second instruction, extracts shelf area information in the second instruction, and sends the second instruction to the sub-platform of the management platform corresponding to the shelf area based on the shelf area information After receiving the second instruction, the sub-platform of the management platform extracts the instruction number, the shelf area, the number of goods to be picked and placed, and the position of goods to be picked and placed, converts them to a third instruction recognized by the automatic stacker, and sends the shelf area information and the third instruction to the general platform of the sensor network platform After receiving the shelf area information and the third instruction, the general platform of the sensor network platform sends the third instruction to a sub-platform of the sensor network platform corresponding to the shelf area based on the shelf area information The sub-platform of the sensor network platform receives the third instruction and sends the third instruction to one or more automatic stackers corresponding thereto, and the one or more automatic stackers pick and place the goods based on the third instruction and feed data of the goods pick and place results back

Figure 5:
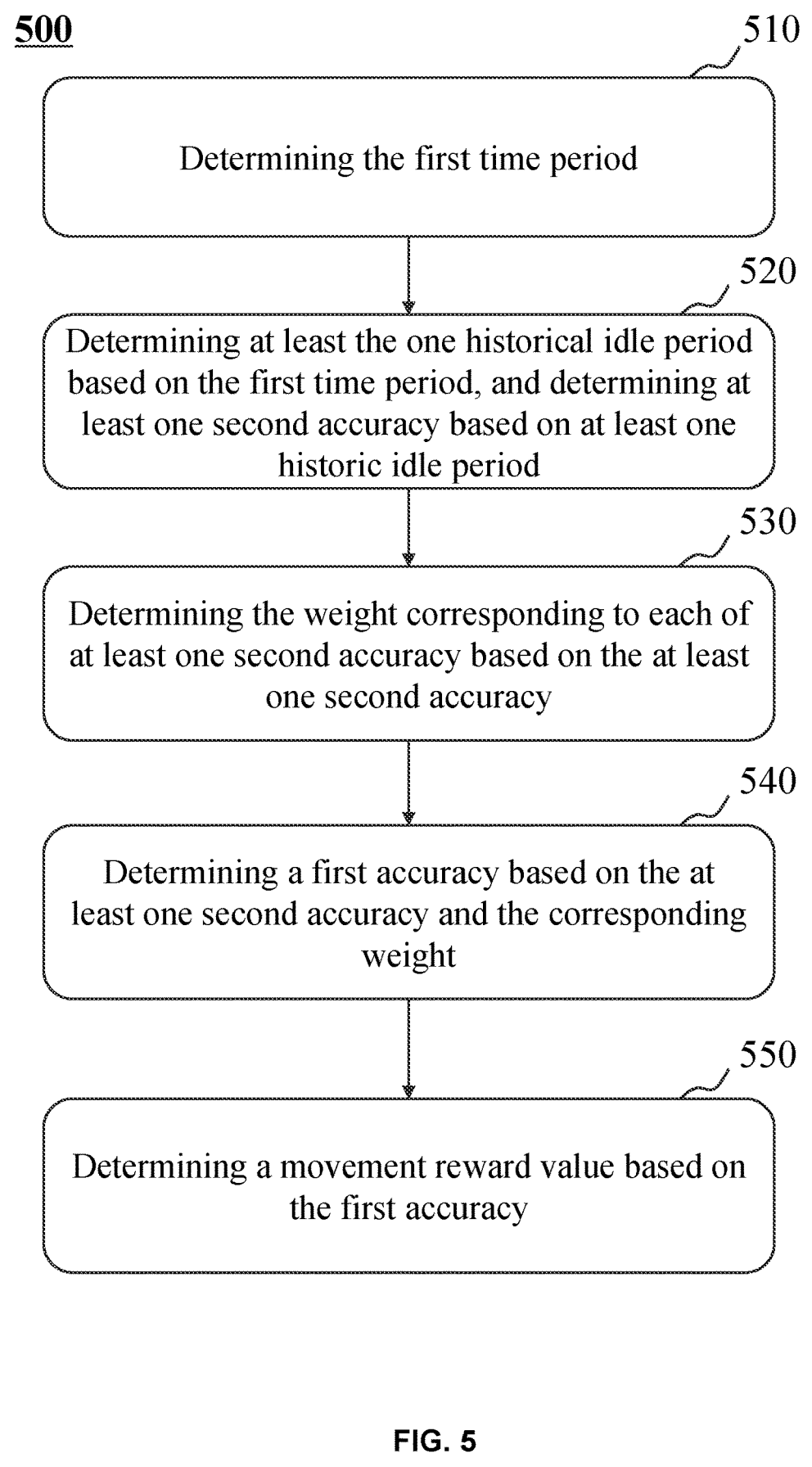

Determining the first time period

520

Determining at least the one historical idle period based on the first time period, and determining at least one second accuracy based on at least one historic idle period

530

Determining the weight corresponding to each of at least one second accuracy based on the at least one second accuracy

540

Determining a first accuracy based on the at least one second accuracy and the corresponding weight

550

Determining a movement reward value based on the first accuracy

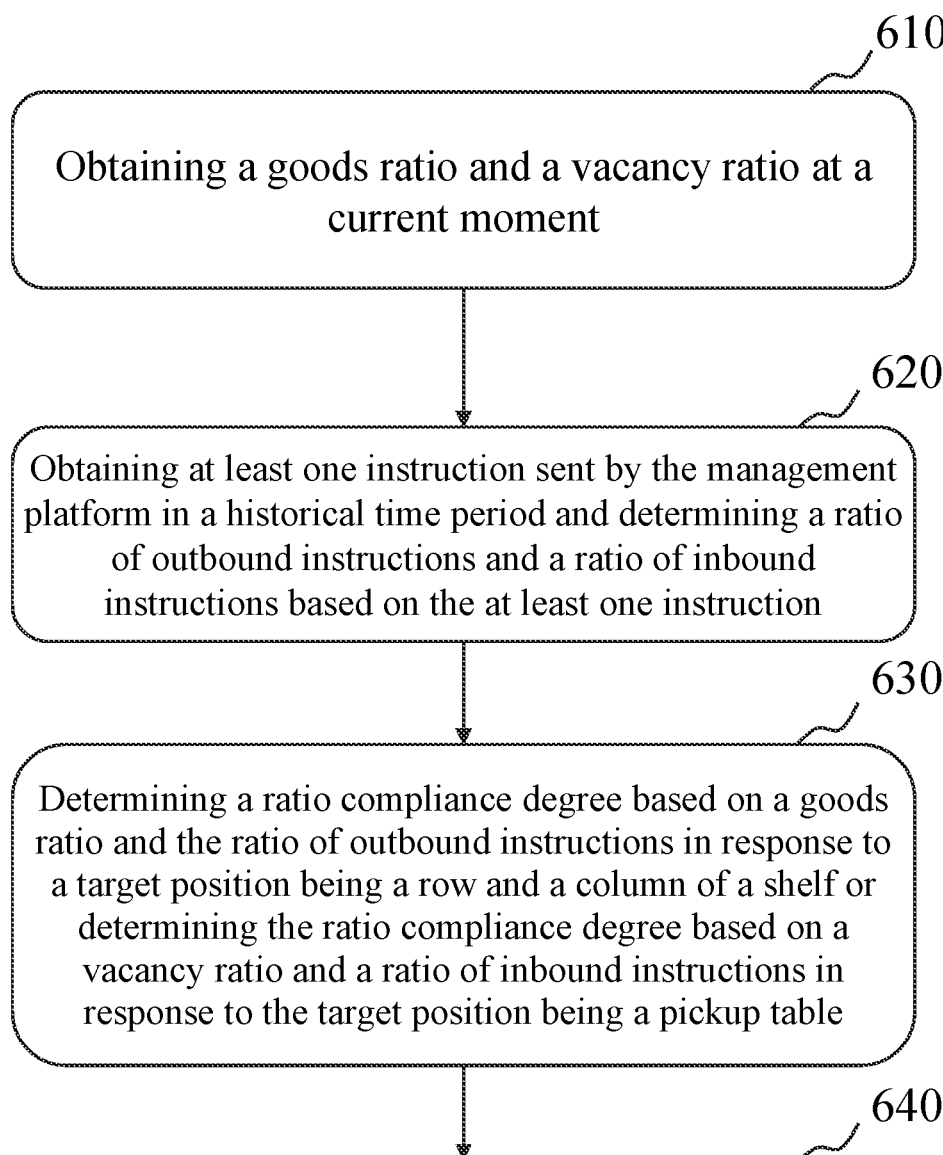

610

Obtaining a goods ratio and a vacancy ratio at a current moment

620

Obtaining at least one instruction sent by the management platform in a historical time period and determining a ratio of outbound instructions and a ratio of inbound instructions based on the at least one instruction

630

Determining a ratio compliance degree based on a goods ratio and the ratio of outbound instructions in response to a target position being a row and a column of a shelf or determining the ratio compliance degree based on a vacancy ratio and a ratio of inbound instructions in response to the target position being a pickup table

640

Determining the movement reward value based on the ratio compliance degree

FIG. 6

INDUSTRIAL INTERNET OF THINGS FOR INTELLIGENT THREE-DIMENSIONAL WAREHOUSE, CONTROLLING METHODS AND STORAGE MEDIUM THEREROF

TECHNICAL FIELD

The present disclosure relates to a field of intelligent manufacturing techniques, and in particular to an industrial Internet of Things for intelligent three-dimensional warehouse, controlling methods, and storage medium thereof.

BACKGROUND

Three-dimensional warehouses are also called high-bay warehouses, which generally means that the warehouses that use several layers, a dozen or even dozens of layers of high shelves to store unit goods, and use corresponding material handling device to perform goods inbound and outbound operation. Among them, an intelligent three-dimensional warehouse is also called an automatic three-dimensional warehouse, which is a fully intelligent warehouse that combines mechanical, electrical, and information technology, mainly including a goods storage system, a goods access and transmission system, and a control and management system, may realize unattended fully automated operations.

In intelligent three-dimensional warehouses, a stacker is essential as the main mechanical device of a material pick and place system. The stacker, also known as a stacking crane, refers to a specific crane that uses a fork or a string rod as a pickup device to grab, transport, and stack in warehouses, workshops, etc., or pick and place unit goods from high shelves. When it is in use, the main function is to run back and forth in the passage of the three-dimensional warehouses, store the goods at an entrance of a roadway into a goods compartment of a shelf, or take out the goods in the goods compartment and transport it to the entrance of the roadway or a designated place.

In the field of intelligent manufacturing technology, intelligent three-dimensional warehouses realize unmanned operations through automatic stackers, and automatic stackers need to pick and place goods according to regulations. For example, goods of different workshops, types, or uses are placed in different areas, or goods of different incoming and outgoing channels are placed in areas according to specific numbers, and the three-dimensional warehouses in some factories have large areas and many layers, and each area needs to be equipped with a plurality of stackers for picking and placing goods, causing a larger number of automatic stackers and extremely large instantaneous data. To manage and control so much quantity of the automatic stackers and data by using an automatic system, larger data storage and processing systems are required, and data processing needs to be punctual and efficient. This all leads to the complex structure of the existing system, high cost, and error-prone data during an interaction, resulting in problems such as wrong picking and placing of goods and wrong picking and placing positions for automatic stackers, which are not conducive to the automatic construction and safe and stable operation of intelligent three-dimensional warehouses.

SUMMARY

According to one of the embodiments of the present disclosure, an industrial Internet of Things for an intelligent three-dimensional warehouse is provided. The industrial Internet of Things for an intelligent three-dimensional warehouse may include user platforms, a service platform, and a management platform, wherein the management platform may be configured to perform the following operations: in response to receiving a second instruction from the service platform, determining whether a moving force of an automatic stacker satisfies the execution condition, wherein the second instruction is determined by the service platform based on a first instruction sent by the user platform of the user platforms, and the first instruction includes a goods retrieval instruction, controlling the automatic stacker to execute a pick-and-place operation in response to the moving force of the automatic stacker satisfying the execution condition, and determining a target standby position and control the automatic stacker to move to the target standby position in response to the automatic stacker completing the pick-and-place operation.

According to one of the embodiments of the present disclosure, an industrial Internet of Things for an intelligent three-dimensional warehouse is provided. The industrial Internet of Things further may include the user platforms, the service platform, and the management platform, a sensor network platform, and an object platform interacting in sequence arranged from top to bottom sequentially. The service platform may adopt an independent arrangement, and both the management platform and the sensor network platform may adopt a front-sub-platform arrangement, the independent arrangement may mean that the service platform includes a plurality of independent sub-platforms, and the plurality of independent sub-platforms may respectively perform data storage, data processing and/or data transmission on data of different lower platforms, the front sub-platform arrangement may mean that each of the management platform and the sensor network platform may include a general platform and a plurality of sub-platforms, the plurality of sub-platforms respectively may store and process data of different types or different receiving objects sent by the lower platform, and the one general platform may store and process data from the plurality of sub-platforms after the data may be aggregated and transmit the data to the upper platform, the object platform may be configured as automatic stackers for different shelf areas in the intelligent three-dimensional warehouses. The sub-platforms of the service platform may correspond to different user platforms, the first instruction may be sent by the user platform of the user platforms, and a sub-platform of the service platform corresponding to the user platform may receive the first instruction, convert the first instruction to the second instruction recognized by the management platform, and send the second instruction to the general platform of the management platform, wherein the second instruction at least may include an instruction number, a shelf area, a number of goods to be picked and placed, and a position of goods to be picked and placed. The general platform of the management platform may receive the second instruction, extract shelf area information in the second instruction, and send the second instruction to the sub-platform of the management platform corresponding to the shelf area based on the shelf area information. After receiving the second instruction, the sub-platform of the management platform may extract the instruction number, the shelf area, the number of goods to be picked and placed, and the positions of goods to be picked and placed, convert them to a third instruction recognized by the automatic stacker, and send the shelf area information and the third instruction to the general platform of the sensor network platform. After receiving the shelf area information and the third instruction, the general platform of the sensor network platform may send the third instruction to a sub-platform of the sensor network platform corresponding to the shelf area based on the shelf area information. The sub-platform of the sensor network platform may receive the third instruction and send the third instruction to one or more automatic stackers corresponding thereto, and the one or more automatic stackers may pick and place the goods based on the third instruction and feed data of the goods pick and place results back.

According to one of the embodiments of the present disclosure, a non-transitory computer-readable storage medium is provided, the storage medium may store a computer instruction, and after reading a computer instruction of the storage medium, a computer may execute any one of the methods mentioned above.

BRIEF DESCRIPTION OF THE DRAWINGS

The present disclosure will be further described in the form of exemplary embodiments, which will be described in detail by the accompanying drawings. These embodiments are not limited, in these embodiments, the same number denotes the same structure, wherein:

FIG. 1 is an exemplary flowchart of an industrial Internet of Things for intelligent three-dimensional warehouses according to some embodiments of the present disclosure;

FIG. 2 is an exemplary structure diagram of the industrial Internet of Things for intelligent three-dimensional warehouses according to some embodiments of the present disclosure;

FIG. 3 is an exemplary flowchart of a method for controlling the industrial Internet of Things for intelligent three-dimensional warehouses according to some embodiments of the present disclosure;

FIG. 5 is an exemplary flowchart of determining a moving reward value based on a first accuracy according to some embodiments of the present disclosure;

FIG. 6 is an exemplary flowchart of determining the moving reward value based on a ratio compliance degree according to some embodiments of the present disclosure;

DETAILED DESCRIPTION

Figure 4:
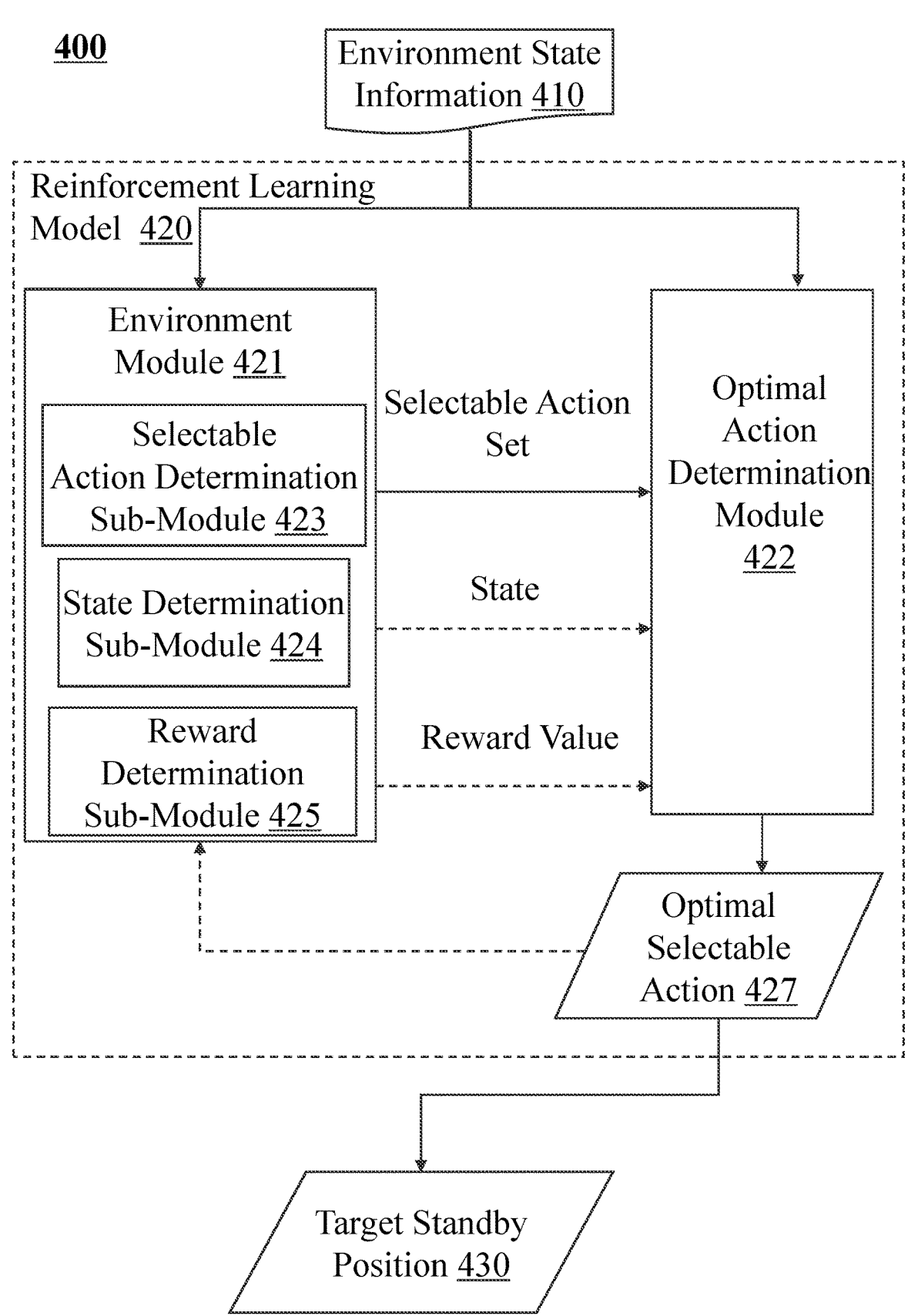
FIG. 4 is an exemplary schematic diagram of determining a target standby position based on a reinforcement learning model according to some embodiments of the present disclosure.

To more clearly explain the technical scheme of the embodiment of the present disclosure, the accompanying drawings required in the description of the embodiment will be briefly introduced below. Obviously, the drawings in the following description are only some examples or embodiments of the disclosure. For those skilled in the art, the present disclosure may also be applied to other similar situations according to these drawings without paying creative labor. Unless it is obvious or explained in the language environment, the same number in drawings represents the same structure or operation.

It should be understood that the "system," "device," "unit" and/or "module" used herein is a method for distinguishing different components, elements, parts, sections, or assemblies of different levels. However, the terms may be displaced by another expression if they achieve the same purpose.

As shown in the present specification and claims, unless the context clearly prompts the exception, the words "one," "a," "an" and/or "the" do not specifically refer to singular form, and the plural form may be included; otherwise, the plural form may include the singular form. Generally speaking, the terms "comprise" and "include" only imply that the clearly identified steps and elements are included, and these steps and elements do not constitute an exclusive list, and the method or device may also include other steps or elements.

A flowchart is used in the present disclosure to explain the operation performed by the system according to the embodiments of the present disclosure. It should be understood that the foregoing or following operations may not necessarily be performed exactly in instruction. Instead, a plurality of steps may be processed in reverse or simultaneously. At the same time, other actions may be added to these procedures, or a step or steps may be removed from these procedures.

An application scenario of an industrial Internet of Things for intelligent three-dimensional warehouses may include a processing device, network, a storage device, and an automatic stacker. The processing device may process information and/or data related to the application scenario of the Industrial Internet of Things for intelligent three-dimensional warehouses, wherein a management platform may be implemented in the processing device. The network may realize the communication of a plurality of components in the application scenario. The storage device may store data, instructions, and/or any other information. The automatic stacker may receive the instructions sent by a management platform, perform the task of picking and placing goods based on the instructions, and perform operations such as picking and placing the goods in the intelligent three-dimensional warehouse.

FIG. 1 is an exemplary flowchart of an industrial Internet of Things for intelligent three-dimensional warehouses according to some embodiments of the present disclosure. In some embodiments, a process 100 may be performed by the management platform. As shown in FIG. 1, the process 100 includes the following steps:

Step 110, in response to receiving a second instruction from a service platform, determining whether a moving force of an automatic stacker satisfies an execution condition, wherein a second instruction is determined through the service platform based on a first instruction sent by a user platform.

The first instruction refers to an instruction configured to control the automatic stacker to perform tasks. For example, the first instruction may be a goods retrieval instruction. The goods retrieval instruction may be an instruction for instructing the automatic stacker to perform a goods retrieval task. The content of the first instruction may include a shelf area to which the automatic stacker is required to go, a position of the goods to be picked and placed, and a number of the goods to be picked and placed. The content of the first instruction may further include moving path information instructing how the automatic stacker moves. In some embodiments, the first instruction may be sent by the user platform and received by the service platform. More descriptions regarding the user platform and the service platform may be found in FIG. 2 and its relevant descriptions thereof.

In some embodiments, the first instruction may include an inbound instruction and an outbound instruction.

The inbound instruction may be an instruction that makes the automatic stacker move to a pickup station to pick up the goods and put them on the shelf. The outbound instruction may be an instruction that makes the automatic stacker to move to the shelf to pick up the goods and put them in a pickup station.

The second instruction refers to an instruction that may be recognized by the management platform based on the conversion of the first instruction. For example, the content of the second instruction may include a shelf area to which the automatic stacker is required to go, a position and a number of the goods to be picked and placed, and moving path information instructing how the automatic stacker moves. In some embodiments, the second instruction may be obtained by converting the first instruction based on the service platform. More descriptions regarding the conversion of the first instruction based on the service platform may be found in FIG. 2 and its relevant descriptions thereof.

The shelf area may be an area formed by one or more shelves in a three-dimensional warehouse. The automatic stacker of the three-dimensional warehouse may correspond to at least one shelf area. The management platform may send the second instruction to the automatic stacker corresponding to the shelf area based on the shelf area in the second instruction.

The positions of the goods to be picked and placed may include a position of picking up goods (also referred to as pickup position) and a position of placing goods. The position of the goods to be picked and placed may be indicated in a plurality of ways, for example, the position of the goods to be picked and placed may be denoted by two three-dimensional coordinates that respectively indicate the goods-picking position and the goods-placing position. Exemplarily, if a three-dimensional coordinate of the pickup position is $(x, y, z)$, which denotes that the pickup position is located in the $x^{th}$ row and the $y^{th}$ column of the $z^{th}$ shelf, wherein x, y, and z are all integers greater than 0. In some embodiments, when a pickup station needs to be indicated, a three-dimensional coordinate including 0 may denote the pickup station. For example, a first pickup station may denote as $(0, 0, 1)$.

The moving force of the automatic stacker may be configured to describe the movement capability of the automatic stacker. For example, the moving force of the automatic stacker may be the maximum distance that the automatic stacker may move in a current state. The moving force of the automatic stacker may be determined based on the current remaining power/oil amount.

In some embodiments, the management platform may determine the moving force required by the instruction through the current position of the automatic stacker, the shelf area, the position of the goods to be picked and placed, and the number of the goods to be picked and placed in the second instruction, and judge whether the moving force of the automatic stacker satisfies the execution condition: if the moving force of the automatic stacker is greater than the moving force required by the instruction, the execution condition may be satisfied.

Step 120, controlling an automatic stacker to perform a pick and place operation in response to moving force of an automatic stacker satisfying an execution condition.

In some embodiments, in response to the moving force of the automatic stacker satisfying the execution condition, the management platform may send the second instruction to the automatic stacker, and control the automatic stacker to perform the pick and place operation.

In some embodiments, in response to the moving force of the automatic stacker satisfying the execution condition, the management platform may extract the instruction number, the shelf area, the number of goods to be picked and placed, and the position of goods to be picked and placed, convert them to a third instruction recognized by the automatic stacker, and send the shelf area information and the third instruction to the general platform of the sensor network platform. After receiving the shelf area information and the third instruction, the general platform of the sensor network platform sends the third instruction to a sub-platform of the sensor network platform corresponding to the shelf area based on the shelf area information. The sub-platform of the sensor network platform receives the third instruction, sends the third instruction to one or more corresponding automatic stackers, and controls the automatic stackers to perform the pick and place operation. More descriptions regarding the third instruction and the sensor network platform may be found in FIG. 2 and its relevant descriptions thereof.

Step 130, in response to the automatic stacker completing a pick-and-place operation (also referred to as pick and place operation), determining the target standby position and controlling an automatic stacker to move to a target standby position.

The target standby position may refer to a position to which the automatic stacker needs to go when it is in an idle period. The target standby position may be denoted by a three-dimensional vector $(x, y, z)$, which means the automatic stacker needs to move to the position where it may directly pick and place the goods in the $x^{th}$ row and the $y^{th}$ column of the $z^{th}$ shelf.

The idle period refers to a time period corresponding to the completion of the instruction by the automatic stacker before the arrival of the next instruction. After receiving a new instruction sent by the management platform, the automatic stacker ends the idle period and starts to perform the new instruction.

In some embodiments, the idle period may be determined based on an instruction execution situation. The instruction execution situation may include a start time and end time of the automatic stacker executing the instruction. For example, the instruction execution situation of the automatic stacker in a historical period is: start executing instruction A at 8:00, complete instruction A at 8:05, start executing instruction B at 8:15, complete instruction B at 8:17, start executing instruction Cat 8:35, complete instruction Cat 8:40 . . . . Then: the time period 8:05-8:15 is an idle period, the start time of the idle period is 8:05, and the end time is 8:15, the time period 8:17-8:35 is an idle period, the start time of the idle period is 8:17 and the end time is 8:35.

In some embodiments, the target standby position may be determined based on a pre-set rule. For example, the pre-set rule may be that the management platform arranges a corresponding target standby position for each automatic stacker, and when the automatic stacker is in an idle period, the management platform may control the automatic stacker to move to its corresponding target standby position. As another example, the pre-set rule may be that the automatic stacker remains stationary in place when it is in an idle period.

In some embodiments, the target standby position may be determined based on the reinforcement learning model. More descriptions regarding the reinforcement learning model and determining the target standby position based on the reinforcement learning model may be found in FIG. 4 and its relevant descriptions thereof.

In some embodiments of the present disclosure, the management platform may better manage and control the pick and place of the goods by uniformly receiving the goods retrieval instructions from the user platforms and arranging the goods retrieval instructions to the automatic stackers in the corresponding shelf areas. Meanwhile, the moving force of each automatic stacker is considered when distributing the goods retrieval instructions to avoid exhausting energy during a process of picking and placing goods by the automatic stackers and causing the on-site business to be blocked, which can allow the intelligent three-dimensional warehouses to operate more efficiently and rapidly.

As shown in FIG. 2, the first embodiment of the present disclosure is desirable to provide an industrial Internet of Things for intelligent three-dimensional warehouse, wherein the industrial Internet of Things further includes the user platforms, the service platform, the management platform, the sensor network platform and an object platform interacting in sequence and arranged from top to bottom. The service platform adopts an independent arrangement, and both the management platform and the sensor network platform adopt a front-sub-platform arrangement, the independent arrangement means that the service platform includes a plurality of independent sub-platforms, and the plurality of independent sub-platforms respectively perform data storage, data processing and/or data transmission on data of different lower platforms. The front sub-platform arrangement means that each of the management platform and the sensor network platform includes a general platform and a plurality of sub-platforms, the plurality of sub-platforms respectively store and process data of different types or different receiving objects sent by the lower platform, and the one general platform stores and processes data from the plurality of sub-platforms after the data is aggregated and transmits the data to the upper platform. The object platform is configured as automatic stackers for different shelf areas in the intelligent three-dimensional warehouse.

The sub-platforms of the service platform correspond to different user platforms, the first instruction is sent by the user platforms, and the sub-platform of the service platform corresponding to the user platform receives the first instruction, converts the first instruction to the second instruction recognized by the management platform, and sends the second instruction to the general platform of the management platform, wherein the second instruction at least includes the instruction number, the shelf area, the number of goods to be picked and placed, and the position of goods to be picked and placed. The general platform of the management platform receives the second instruction, extracts shelf area information in the second instruction, and sends the second instruction to the sub-platform of the management platform corresponding to the shelf area based on the shelf area information. After receiving the second instruction, the sub-platform of the management platform extracts the instruction number, the shelf area, the number of goods to be picked and placed, and the position of goods to be picked and placed to the third instruction recognized by the automatic stacker and sends the shelf area information and the third instruction to the general platform of the sensor network platform. After receiving the shelf area information and the third instruction, the general platform of the sensor network platform sends the third instruction to the sub-platform of the sensor network platform corresponding to the shelf area based on the shelf area information.

The sub-platform of the sensor network platform receives the third instruction and sends the third instruction to one or more automatic stackers corresponding thereto, and the one or more automatic stackers pick and place the goods based on the third instruction and feed the data of the goods pick and place results back.

The goods in the three-dimensional warehouses must be classified or placed in areas according to pre-set or different rules and the goods need to be obtained according to specific requirements when being picked and placed, to avoid misplacing the goods and affecting the subsequent storage and pick of the goods. In the prior art, since the three-dimensional warehouse occupies a large area, has a high number of layers, and has a large inventory, a plurality of corresponding automatic stackers is generally arranged. Due to a larger number and extremely large instantaneous date of automatic stackers, to manage and control so much quantity of stackers and data by using an automatic system, a larger data storage and processing systems are required, and data processing must be punctual and efficient. This all leads to the complex structure of the existing system, high cost, and error-prone data during an interaction, resulting in problems such as wrong picking and placing of goods and wrong picking and placing positions for automatic stackers, which are not conducive to the automation construction and safe and stable operation of intelligent three-dimensional warehouses.

And the industrial Internet of Things for intelligent three-dimensional warehouse of the present disclosure construct the Internet of Things based on a five-platform structure to build the Internet of Things, wherein the service platform adopts the independent arrangement and each sub-platform of the service platforms corresponds to the different user platforms, thereby each user platform has an independent service platform corresponding to perform data interaction, which is convenient for data management, solves the problem of a high pressure of the data interaction on an individual service platform when a plurality of users use it, and the data may also interact with the user platform more accurately and efficiently. Moreover, both the management platform and the sensor network platform adopt a front-sub-platform arrangement, the two use a general platform to recognize the shelf area for all data and classify and distribute different data based on the shelf area so that all data may be partitioned and classified, and the data corresponding to the sub-platform and upper platform may ensure that all data is independently processed and transmitted according to area information. Meanwhile, both the management platform and the sensor network platform are provided with a plurality of sub-platforms, each of which works independently and corresponds to the data processing and transmission of the unique shelf area, realizing the conversion and recognition of the corresponding data, and realizing the independent data interaction with the upper and lower platforms, which allows a path of data in the whole operation process is unique and effective. With the general platform and sub-platforms performing the respective functions, the data processing requirements of the two platforms are greatly reduced, the construction cost is also reduced, and the data processing speed and capability of each platform are further improved.

When using the industrial Internet of Things for intelligent three-dimensional warehouses of the present disclosure, different user platforms correspond to the sub-platforms of the independent and unique service platform. User platforms may correspond to different workshops, transport systems, plants, etc., so that the information of the goods demander may be clearly obtained through the design, which is convenient for later goods statistics or traceability, etc. The management platform uniformly performs data processing to the sub-platforms of all the service platforms through the arrangement of front-sub-platform and the general platform of one management platform, classifies and partitions the data of sub-platforms of different service platforms through the shelf area. An independent physical structure is formed through the sub-platforms of a plurality of management platforms, respectively and independently corresponding to the system structure independently processed by the shelf area data, which ensures that the data of each area does not affect and conflict with each other, improves the accuracy and speed of data processing, and reduce the data processing pressure and construction cost of each sub-platform. Similarly, the sensor network platform also adopts the front-sub-platform arrangement to allow the one or more automatic stackers of each shelf area to correspond to independent sub-platforms of the sensor network platform and uses the general platform of the sensor network platform to independently transmit the corresponding data to the corresponding sub-platforms of the sensor network platform, ensure that the automatic stackers in each shelf area operate relatively and independently without not affect each other, which can realize automatic control of the plurality of automatic stackers in a plurality of shelf areas, improve the efficiency and accuracy of picking and placing goods in the three-dimensional warehouses, and effectively solve the problems of repeated execution of the same instruction and wrong pick and place by the plurality of automatic stackers.

It should be noted that the user platforms of the embodiment may be a desktop computer, a tablet computer, a notebook computer, a mobile phone, or other electronic devices capable of data processing and data communication, which is not limited herein. In a specific application, a first server and a second server may be a single server or a server cluster, which is not limited herein. It should be understood that the process of data processing mentioned in the embodiment may be processed by a processor of the server, and the data stored in the server may be stored in a storage device of the server, such as a hard disk or other memories. In the specific application, the sensor network platform may use a plurality group of gateway servers or plurality groups of intelligent routers, which is not limited herein. It should be understood that the process of data process mentioned in the embodiments of the disclosure may be processed by the processor of a gateway server, and the data stored in the gateway server may be stored in the storage device of the gateway server, such as a hard disk, SSD or other memories.

In a practical application, the corresponding sub-platform of the service platform receives the first instruction, and converts the first instruction into a second instruction recognized by the management platform, and sends the second instruction to the general platform of the management platform. Specifically: when reviving the first instruction, the sub-platform of the service platform at least extracts an instruction number, the shelf area, the number of goods to be picked and placed, and the position of goods to be picked and placed. The sub-platform of the service platform sequentially compiles the instruction number, the shelf area, the number of the goods to be picked and placed, and the position of the goods to be picked and placed into corresponding data codes, and finally, makes all data codes formed into a data code set according to a compilation rule. And the data code set is converted into the second instruction recognized by the management platform and sent to the general platform of the management platform.

In the practical application, the general platform of the management platform receives the second instruction, extracts the shelf area information of the second instruction, and sends the second instruction to the sub-platform of the management platform corresponding to the shelf area based on the shelf area information. Specifically: the general platform of the management platform pre-stores an association table of the shelf area information, and the association table of the shelf area information at least includes the shelf area and the corresponding sub-platform of the management platform. After receiving the second instruction, the general platform of the management platform extracts the shelf area information of the second instruction and identifies the sub-platform of the management platform corresponding to the shelf area based on the shelf area information. And the general platform of the management platform sends the second instruction to the corresponding target platform.

In the practical application, after receiving the shelf area information and the third instruction, the general platform of the sensor network platform sends the third instruction to the sub-platform of the sensor network platform corresponding to the shelf area based on the shelf area information. Specifically: after receiving the shelf area information and the third instruction, the general platform of the sensor network platform first extracts the shelf area information and finds out the sub-platform of the sensor network platform corresponding to the shelf area based on the shelf area information. And the general platform of the sensor network platform sends the third instruction to the sub-platform of the sensor network platform corresponding to the shelf area.

In the practical application, when extracting the plurality of shelf area information, the general platform of the sensor network platform sequentially finds out the sub-platforms of the sensor network platform corresponding to the plurality of shelf areas and sends the third instruction to all sub-platforms found in the sensor network platform.

In the practical application, the third instruction further includes execution moment data, the one or more automatic stackers, after receiving the third instruction, read the execution moment data and execute the third instruction at an execution moment.

In the practical application, the industrial Internet of Things for intelligent three-dimensional warehouse mentioned above further includes: after the one or more automatic stackers feed data of the goods pick and place result back, the data of the goods pick and place result is sent to all sub-platforms of the service platform through the sensor network platform and the management platform. A goods data table is stored in the sub-platforms of all service platforms and corresponds to all the goods numbers and storage positions of all pickup areas. After obtaining data of the goods pick and place result, the sub-platform of the service platform reads data of the goods pick and place result, obtains the number and position of the pick and place, and updates the goods data table based on the goods pick and place data. And before the user platform sends the first instruction, the sub-platform of the corresponding service platform sends the goods data table to the user platform, and the user platform may consult the goods data and send the first instruction based on the goods data table.

As shown in FIG. 3, the second embodiment of the present disclosure provides a controlling method for the industrial Internet of Things for intelligent three-dimensional warehouse, wherein the industrial Internet of Things further includes the user platform, the service platform, the management platform, the sensor network platform and the object platform interacting in sequence and arranged from top to bottom.

The service platform adopts an independent arrangement, and both the management platform and the sensor network platform adopt the front-sub-platform arrangement; an independent arrangement means that the service platform includes the plurality of independent sub-platforms, and the plurality of independent sub-platforms respectively perform data storage, data processing and/or data transmission on data of different lower platforms. The front sub-platform arrangement means that each of the management platforms and the sensor network platform includes one general platform and a plurality of sub-platforms. The plurality of sub-platforms stores and processes data of different types or different receiving objects sent by the lower platform, respectively. The one general platform stores and processes data from the plurality of sub-platforms after the data is aggregated and transmits the data to the upper platform. The object platform is configured as automatic stackers for different shelf areas in the intelligent three-dimensional warehouses. The method of controlling includes the sub-platforms of the service platform corresponding to different user platforms, the first instruction is sent by the user platform of the user platforms, and the sub-platform of the service platform corresponding to the user platform receives the first instruction, and converts the first instruction to the second instruction recognized by the management platform, and sends the second instruction to the general platform of the management platform, the second instruction at least includes the instruction number, the shelf area, the number of goods to be picked and placed, and the position of goods to be picked and placed. The general platform of the management platform receives the second instruction, extracts shelf area information in the second instruction, and sends the second instruction to the sub-platform of the management platform corresponding to the shelf area based on the shelf area information. After receiving the second instruction, the sub-platform of the management platform extracts the instruction number, the shelf area, the number of goods to be picked and placed, and the position of goods to be picked and placed to the third instruction recognized by the automatic stacker and sends the shelf area information and the third instruction to the general platform of the sensor network platform. After receiving the shelf area information and the third instruction, the general platform of the sensor network platform sends the third instruction to the sub-platform of the sensor network platform corresponding to the shelf area based on the shelf area information. The sub-platform of the sensor network platform receives the third instruction and sends the third instruction to one or more automatic stackers corresponding thereto, and the one or more automatic stackers pick and place the goods based on the third instruction and feed data of the goods to be picked and placed results back.

Those skilled in the art may realize that the units and algorithm steps of each example described combined with the embodiments in the present disclosure may be implemented with electronic hardware, computer software, or a combination of the two. To clearly explain the interchangeability of hardware and software, in the above description, the composition and steps of each example have been generally described according to the function. Whether these functions are performed in hardware or software depends on the specific application and design constraints of the technical solution. Professional technicians may use different methods to implement the described functions for each specific application, but this implementation should not be considered to exceed the scope of the present disclosure.

In several embodiments provided in the present disclosure, it should be understood that the disclosed devices and methods may be implemented in other ways. For example, the apparatus embodiments described above are only illustrative. For example, the division of the units is only a logical function division. In actual implementation, there may be other division methods. For example, multiple units or components may be combined or may be integrated into another system, or some features may be omitted, or not implemented. In addition, the shown or discussed mutual coupling or direct coupling, or communication connection may be indirect coupling or communication connection through some interfaces, devices, or units, and may also be electrical, mechanical, or other forms of connection.

The unit described as a separate part may or may not be physically separated. As a unit, those skilled in the art may realize that the unit and algorithm steps of each example described in combination with the embodiments disclosed herein may be recognized by electronic hardware, computer software, or a combination of the two. To clearly illustrate the interchangeability of hardware and software, In the above description, the composition and steps of each example have been generally described according to the function. Whether these functions are performed in hardware or software depends on the specific application and design constraints of the technical solution. Professional technicians may use different methods to implement the described functions for each specific application, but this implementation should not be considered to exceed the scope of the present disclosure.

In addition, each functional unit in each embodiment of the present disclosure may be integrated into one processing unit, or physical existence alone, or two or more units integrated into one unit. The above-mentioned integrated units may be implemented in the form of hardware or may be implemented in the form of software functional units.

The integrated unit, if implemented in the form of a software functional unit and sold or used as an independent product, may be stored in a computer-readable storage medium. Based on this understanding, the technical solution of the present disclosure is essentially contributed to existing technology, or all or part of the technical solution may be reflected in the form of software products. The computer software product is stored in a storage medium including several instructions to enable a computer device (may be a personal computer, server, or grid device, etc.) to perform all or part steps of the methods described in each embodiment of the present disclosure. The aforementioned storage medium includes U disk, mobile hard disk, read-only memory (ROM, READ-ONLY MEMORY), RAM, RAM, RANDOM Access Memory, disk, or disc or optical disk, etc. may store program code The specific embodiments described above have further explained the purpose, technical solution, and beneficial effects of the present disclosure. It should be understood that the above-mentioned specifications are only the specific implementation methods of the present disclosure, not required to limit the protection scope of the present disclosure. Any modification, equivalent replacement, improvement, etc. in the spirit and principles of the present disclosure should be included within the protection range value of the present disclosure.

FIG. 4 is an exemplary schematic diagram of determining a target standby position based on a reinforcement learning model according to some embodiments of the present disclosure. In some embodiments, a process 400 may be performed by the management platform.

As shown in FIG. 4, the management platform may input environment state information 410 into a reinforcement learning model 420, and the reinforcement learning model 420 outputs a target standby position 430 based on the environment state information 410 input. More descriptions regarding the target standby position may be found in FIG. 1 and its relevant descriptions thereof.

Environment state information refers to information configured to describe the state involved in the process of the automatic stacker being in the idle period. For example, environment state information 410 may include position information, an idle duration, and a movement length during the idle period of the automatic stacker.

The position information of the automatic stacker is configured to indicate the information, such as the shelf, the row number, and column number of the shelf corresponding to the current position of the automatic stacker. The position information of the automatic stacker may be denoted in a plurality of ways, such as a three-dimensional vector (x, y, z), which means that the automatic stacker is currently in a position where the automatic stacker may pick and place the goods in the $x^{th}$ row and the $y^{th}$ column of the $z^{th}$ shelf.

In some embodiments, the management platform may obtain the position information of the automatic stacker through a position sensor deployed on the automatic stacker or other means.

The idle period refers to the time elapsed from the moment when the automatic stacker enters the idle period to a current moment during the idle period. For example, the automatic stacker completes the pick and place operation at 8:00 and enters the idle period, if no new instruction is received during 8:00-8:05, the idle duration corresponding to 8:05 is 5 minutes.

In some embodiments, the management platform may determine the idle duration of the automatic stacker in a plurality of ways. For example, if a clock is arranged in the automatic stacker or the management platform, the clock may start timing when the automatic stacker completes the instruction and is cleared when the automatic stacker receives a new instruction. The value displayed by the clock is the idle duration of the automatic stacker.

The movement length during the idle period refers to a length of the path that the automatic stacker has moved during the idle period. In some embodiments, the movement length during the idle period may include the length of the path moved by the stacker body on a flat surface (e.g., ground) and the length of the path moved up and down by the stacker carrier platform in the stacker body.

In some embodiments, the management platform may determine the movement length within the idle period by obtaining the position information of the automatic stacker or other means in real-time.

The reinforcement learning model 420 may be configured to determine the target standby position. An input of the reinforcement learning model 420 is the environment state information 410 and an output is a target standby position 430. The reinforcement learning model 420 includes an environment module 421 and an optimal action determination module 422.

In some embodiments, when the target standby position 430 is determined based on the reinforcement learning model 420, the environment state information 410 may be input into the reinforcement learning model 420. Within the model, the environment state information 410 is input into an environment module 421, which outputs a set of selectable actions. Within the model, the environment state information 410 and the set of selectable actions are input into an optimal action determination module 422, which outputs an optimal selectable action 427. The target position corresponding to the optimal selectable action 427 output by the optimal action determination module 422 is determined as the target standby position 430 which is used as the output of the reinforcement learning model 420. For example, if the optimal selectable action is stationary, the target position corresponding to the optimal selectable action is the current position of the automatic stacker. As another example, the optimal selectable action moves to $(x_1, y_1, z_1)$, the target position corresponding to the optimal selectable action is $(x_1, y_1, z_1)$, and the target standby position is $(x_1, y_1, z_1)$.

The environment module 421 may include a selectable action determination sub-module 423, a state determination sub-module 424, and a reward determination sub-module 425. During the prediction process of the reinforcement learning model 420, the environment module 421 may determine the set of selectable actions through a selectable action sub-module 423 based on the environment state information 410. During the training process of the reinforcement learning model 420, the state determination sub-module 424 and the reward determination sub-module 425 in the environment module 421 may be configured to determine environment state information and a reward value at the next moment, respectively.

The selectable action determination sub-module 423 may determine the selectable action set of the automatic stacker at the current moment based on the environment state information at the current moment.

The selectable action set refers to the set of actions that the automatic stacker may perform in a certain environmental state. In some embodiments, the actions that the automated stacker may perform may include being stationary and moving to a target position. The target position refers to the position (e.g., a row and a column of a shelf, a certain pick-up table) the automatic stacker may move to in the current situation. Under different environmental states, reachable target positions of the automatic stacker may be different.

In some embodiments, the environment module 421 may, based on the position information of the automatic stacker in the environment state information at the current moment, determine two classes of actions as the set of selectable actions (or referred to as the selectable action set) of the automatic stacker at the current moment, one of which is moving to a position where the current position satisfying pre-set conditions, and/or another of which is remaining stationary. In some embodiments, the pre-set conditions may be determined based on a three-dimensional warehouse structure, a shelf structure, etc. Exemplarily, the current position of the automatic stacker is (1, 1, 4), and the pre-set condition is: when the difference between the shelf number of the current position and the shelf number corresponding to the position to be moved is not more than 2, and the actions of remaining stationary and/or moving to a position corresponding to any row and any column of the shelves 2-6 are determined as the set of selectable actions (or referred to as the selectable action set) of the automatic stacker at the current moment.

The state determination sub-module 424 may determine the environment state information at the next moment based on the environment state information at the current moment and the optimal selectable action output by an optimal action determination module. For example, the environment state information of the automatic stacker at the current moment is (1,1,1), and the optimal selectable action output by the optimal action determination module is moving to the target standby position (2, 1, 1). After the automatic stacker performs the optimal selectable action, the state determination sub-module 424 determines the position information of the automatic stacker as (2, 1, 1) at the next moment, at the same time, the idle duration in the environment state information and the movement length in the idle period are updated based on the elapsed time and the length of the path moved.

The reward determination sub-module 425 may be configured to determine the reward value. The reward value may be configured to evaluate an improvement degree in the efficiency of the next execution instruction after the automatic stacker performs actions. For example, for actions with a high level of improvement, the reward value may be higher; for actions with a low or negative level of improvement, the reward value may be lower. The reward value may be denoted numerically or otherwise. The improvement degree in the efficiency of the next execution instruction may be determined based on the distance between the target position the automatic stacker moving to during the idle period and the pickup position corresponding to the instruction received by the automatic stacker in the future moment. The shorter the distance, the faster the automatic stacker moves to the pickup position corresponding to the instruction, and the greater the improvement in the efficiency of the next execution instruction. In some embodiments, the reward determination sub-module 425 may determine the reward value based on a formula arranged.

In some embodiments, when the automatic stacker performs a stationary action or performs an action of moving to the target position, the reward determination sub-module 425 may determine the reward value of the corresponding action based on different ways.

In some embodiments, the reward value of the automatic stacker performing a stationary motion may relate to the idle duration and the movement length during the idle period. For example, the longer the idle duration, the longer the movement length during the idle period, the higher the reward value of the automatic stacker performing the stationary action.

Exemplarily, the reward value of the automatic stacker performing the stationary action may be calculated through the following formula (1):

$$r = k_1 t_1 + k_2 t_2 \tag{1}$$

Wherein, r is the reward value of the action, $t_1$ is the idle duration, $t_2$ is the movement length during the idle period, $k_1$ and $k_2$ are weight coefficients of the idle duration and the movement length during the idle period, respectively, $k_1$ and $k_2$ may be determined based on experience, for example, both $k_1$ and $k_1$ may be 0.5.

In some embodiments, the reward value of the automatic stacker performing the action of moving to the target position may relate to the expected movement value of moving to the target position.

The expected movement value may be configured to describe the benefits brought by the automatic stacker moving to the target position. For example, the target position the automatic stacker moves to during the idle period is (1, 1, 1); if the pickup position corresponding to the instruction received by the automatic stacker in the future is (1, 1, 1), and the automatic stacker may directly execute the instruction without moving first, and the execution of the action during the idle period may be considered to bring high benefits.

In some embodiments, the expected movement value may be determined based on an expected value comparison table in the reward determination sub-module 425. For example, the expected movement value of the automatic stacker moving to different target positions may be found in an expected value comparison table. The management platform may determine the expected movement value of the automatic stacker moving to the target position at the current position by querying the expected value comparison table. In some embodiments, the expected value comparison table may be stored in the management platform and periodically updated by management personnel based on experience.

In some embodiments, the expected movement value may relate to a movement reward value and a movement penalty value.

The expected movement value refers to the reward value brought by the automatic stacker moving to the target position.

In some embodiments, the movement reward value may be determined based on the frequency of the target position specified as the pickup position in the instruction within a historical time period. For example, the movement reward value may be calculated through the following formula (2):

$$r_m = k \frac{p_b}{p_a}. \tag{2}$$

Wherein, $r_m$ is the movement reward value, $p_a$ is the total number of instructions sent by the management platform within the historical time period, $p_b$ is the number of times the target position is specified as the pickup position in the instruction within the historical time period, and k is a pre-set parameter for adjusting the movement reward value, k may be determined based on experience, for example, k may be 10.

In some embodiments, the expected movement value relates to a first accuracy, the management may determine the movement reward value based on the first accuracy. More descriptions regarding the first accuracy and determining the movement reward value based on the first accuracy may be found in FIG. 5 and its relevant descriptions thereof.

In some embodiments, the movement reward value may further relate to the ratio compliance degree, and the management platform may determine the movement reward value based on the ratio compliance degree. More descriptions regarding the ratio compliance degree and determining the movement reward value based on the ratio compliance degree may be found in FIG. 6 and its relevant descriptions thereof.

The movement penalty value refers to a penalty value brought by the automatic stacker moving to the target position. The penalty value may be configured to describe the penalty brought by the movement of the automatic stacker, which relates to a moving distance and moving energy consumption, for example, the farther the moving distance, the greater the energy consumption and the greater the penalty value.

In some embodiments, the movement penalty value may be determined based on the distance between the current position and the target position of the automatic stacker. For example, the movement penalty value may be calculated through the following formula (3):

$$r_p = kd \tag{3}$$

Wherein, $r_p$ is the movement penalty value, d is the distance between the current position and the target position of the automatic stacker, k is the preset parameter for adjusting the movement penalty value, and k may be determined based on experience, for example, k may be 1.

In some embodiments, the expected movement value may be determined based on the movement reward value and the movement penalty value. For example, the movement expectation value may be the difference between the movement reward value and the movement penalty value.

In some embodiments of the present disclosure, the movement penalty value may be determined based on the distance between the current position and the target position of the automatic stacker, and the movement expectation value may be comprehensively determined based on the movement reward value and the movement penalty value, so that the reinforcement learning model can improve efficiency and reduce energy consumption to avoid merely pursuing efficiency or merely reducing energy consumption, and can schedule the automatic stacker in the three-dimensional warehouse more efficiently.

In some embodiments, the expected value of movement may be determined as the reward value of the automated stacker performing the action of moving to the target position.

The optimal action determination module may determine the optimal selectable action based on the environment state information 410, the set of selectable actions at the current moment. The inputs of the optimal action determination module 422 are the environment state information 410 and the set of selectable actions. The output of the optimal action determination module 422 is the optimal selectable action 427.

In some embodiments, for each selectable action of the set of selectable actions, the optimal action determination module may internally output a recommended value. The optimal action determination module may determine the selectable action with the largest recommended value as the optimal selectable action and the output.

In some embodiments, the optimal action determination module 422 may be a machine learning model, which may be realized in a plurality of ways, such as Deep Neural Network (DNN), Convolutional Neural Network (CNN), Recurrent Neural Network (RNN), etc.

In some embodiments, the optimal action determination module 422 may be obtained based on a reinforcement learning training method, such as Deep Q-Learning Network (DQN), Double Deep Q-Learning Network (DDQN), etc. A training sample may be historical environment state information, and a label may be the optimal selectable action corresponding to the historical environment state information. The training sample may be obtained based on historical data. The label of the training sample may be obtained through a reinforcement learning method.

In some embodiments, the management platform may periodically execute the reinforcement learning model 420 and output the optimal selectable action based on a pre-set trigger condition. For example, the pre-set trigger condition is that: the automatic stacker completes the optimal selectable action currently output by the reinforcement learning model 420. As another example, the pre-set trigger condition is that: the automatic stacker completes the optimal selectable action currently output by the reinforcement learning model 420, and the time since the last execution of the reinforcement learning model has exceeded a preset period value, such as 10 seconds.

In some embodiments of the present disclosure, the target standby position of the automatic stacker is determined through the reinforcement learning model, so that the automatic stacker may move to the pickup position corresponding to a future instruction in advance based on environment information to reduce the time of the automatic stacker executing an instruction, and improve the overall efficiency of picking and placing goods of the three-dimensional warehouses.

FIG. 5 is an exemplary flowchart of determining a movement reward value based on a first accuracy according to some embodiments of the present disclosure. In some embodiments, a process 500 may be performed through the management platform. As shown in FIG. 5, the process 500 includes the following steps:

Step 510, determining a first time period.

The first time period refers to a time period with a historical moment as a start moment and the current moment as an end moment. For example, assuming that the current time is 9:00, the first time period may be within the past one hour (i.e., 8:00-9:00), within the past two hours (i.e., 7:00-9:00), etc.

In some embodiments, the management platform may determine the first time period based on instructions historically executed by the automated stacker. For example, the management platform may determine a shortest historical time period in which the number of instructions historically executed by the automatic stacker satisfies the preset condition as the first time period. Exemplarily, if the current time is 9:00, the preset condition is that the number of instructions historically executed by the automatic stacker is greater than or equal to 3, and the instructions situation executed by the automatic stacker in the historical time period (the execution of the last few instructions) are: completing execution of an instruction at 7:05, completing execution of an instruction at 7:35, completing execution of an instruction at 8:00, completing execution of an instruction at 8:30, completing execution of an instruction at 8:50, the management platform may determine the first time period as 8:00-9:00, which is the shortest time period satisfying the preset conditions (the number of completed instructions is 3).

Step 520, determining at least one historical idle period based on a first time period and determining at least one second accuracy based on at least one historical idle period.

A historical idle period refers to an idle period in which both the start time and the end time are within the first time period.

In some embodiments, the management platform may obtain the instruction execution situation of the automatic stacker within the first time period based on the first time period, and determine the at least one historical idle period based on the instruction execution situation. For example, if the current time is 9:00 and the first time period is 8:00-9:00, and the instruction executions of the automatic stacker in the first time period are: starting execution of an instruction A at 8:00, completing execution of the instruction A at 8:05, starting execution of an instruction B at 8:17, completing execution of the instruction B at 8:17, starting execution of an instruction C at 8:35, completing execution of the instruction C at 8:40, then the time period 8:05-8:15 is a historical idle period, and the time period 8:17-8:35 is a historical idle period.

The second accuracy may be configured to describe the proximity between the target standby position of the automatic stacker during the historical idle period and the pickup position in the instruction received by the automatic stacker at the end of the historical idle period. For example, the automatic stacker is at the target standby position (1, 1, 1) during a certain historical idle period, the pickup position corresponding to the instruction received by the automatic stacker at the end of the historical idle period is (1, 1, 1), and a second accuracy corresponding to the historical idle period is 100%.

In some embodiments, the management platform may, based on the historical idle period, obtain the target standby position of the automatic stacker during the historical idle period, the pickup position of the automatic stacker in the instruction received at the end of the historical idle period, and may, based on the target standby position and the pickup position, determine the second accuracy. For example, the second accuracy may be calculated through the following formula (4):

$$c = \left(1 - k_1 \frac{|x_a - x_b|}{\max(x_a, x_b)} - k_2 \frac{|y_a - y_b|}{\max(y_a, y_b)} - k_3 \frac{|z_a - z_b|}{\max(z_a, z_b)}\right) \times 100\%. \tag{4}$$

Wherein, c is the second accuracy, $x_a$, $y_a$, $z_a$ correspond to the target standby position coordinates $(x_a, y_a, z_a)$ of the automatic stacker during the historical idle period, $x_b$, $y_b$, $z_b$ correspond to the pickup position $(x_a, y_a, z_a)$ in the instruction received at the end of the historical idle period, $|x_b-x_b|$ denotes an absolute value of $x_a-x_b$, $\max(x_a, x_b)$ denotes the maximum value of both $x_a$ and $x_b$, and $k_1$, $k_2$, $k_3$ are weight parameters. In some embodiments, $k_1$, $k_2$, $k_3$ may be determined based on experience, for example, each of $k_1$, $k_2$, $k_3$ may be ⅓.

Step 530, determining a weight corresponding to each of at least one second accuracy based on the at least one second accuracy.

The weight may be configured to describe a reference degree of the second accuracy when the first accuracy is calculated. For example, the larger the weight corresponding to the second accuracy is, the greater the reference degree of the second accuracy is.

In some embodiments, the management platform may obtain the end moment of the idle period corresponding to each of the at least one second accuracy, and determine the weight corresponding to each second accuracy based on the interval between the end time and current time of the idle period. For example, the ratio may be calculated through the formula (5):

$$m = \frac{k}{t}. \tag{5}$$

Wherein, m is the weight corresponding to the second accuracy, t is the interval between the end moment of the idle period corresponding to the second accuracy and the current moment, k is the preset parameter for adjusting the weight, and k may be determined based on experience, for example, k may be 1.

Step 540, determining a first accuracy based on the at least one second accuracy and the corresponding weight.

The first accuracy may be configured to describe the average value of the proximity of the target standby position of the automatic stacker for at least one idle period within the first time period and the pickup position in the instruction received at the end of the idle period.

In some embodiments, the management platform may determine the first accuracy through a weighted sum based on the at least one second accuracy and the corresponding weight. Exemplarily, the first accuracy may be calculated through the following formula (6):

$$\bar{c} = \sum_{c_i \in A} m_i c_i. \tag{6}$$

Wherein, $\bar{c}$ is the first accuracy, A is a set composed of the second accuracy, and each second accuracy in set A is numbered with a positive integer, $c_i$ is the $i^{th}$ second accuracy of the set, $m_i$ is the weight of the second accuracy $c_i$.

Step 550, determining a movement reward value based on the first accuracy.

In some embodiments, the management platform may determine the movement reward value based on the first accuracy. For example, the movement reward value may be calculated through the following formula (7):

$$r_m = k\bar{c}\frac{p_b}{p_a}. \tag{7}$$

Wherein, $r_m$ is the movement reward value, $\bar{c}$ is the first accuracy, $p_a$ is the total number of instructions sent by the management platform in the historical time period, $p_b$ is the number of times the target position is specified as the pickup position in the instruction in the historical time period, k is the preset parameter for adjusting the size of the movement reward value, and k may be determined based on experience, for example, k may be 10.

In some embodiments of the present disclosure, by introducing the first accuracy to determine the movement reward value, the reliability of the target standby position which the automatic stacker historically moving to may be fully considered, which may use a historical situation as the reference to guide future behavior, thereby more accurately determining the target standby position of the automatic stacker.

FIG. 6 is an exemplary flowchart of determining the moving reward value based on a ratio compliance degree according to some embodiments of the present disclosure. In some embodiments, a process 600 may be performed through the management platform. As shown in FIG. 6, the process 600 includes the following steps:

Step 610, obtaining a goods ratio and a vacancy ratio at a current moment.

The goods ratio refers to the ratio of the stored goods in the three-dimensional warehouse to the total capacity of the three-dimensional warehouse. The vacancy ratio refers to the ratio of the vacant space of the three-dimensional warehouse that does not currently store goods to the total capacity of the three-dimensional warehouse. For example, suppose 400 pieces of goods are stored in the current three-dimensional warehouse, and the total capacity of the three-dimensional warehouse is 1,000 pieces, the goods ratio is 40%, and the vacancy ratio is 60%. In some embodiments, the management platform may obtain the goods ratio and vacancy ratio through a sensor, a camera on the shelf, or other methods.

Step 620, obtaining at least one instruction sent by the management platform in a historical time period and determining a ratio of outbound instructions and a ratio of inbound instructions based on the at least one instruction.

In some embodiments, the historical time period may be determined based on experience. For example, the historical time period may be the last 2 hours, the last 1 hour, etc. In some embodiments, the management platform may obtain the instructions sent by itself within the historical time period and count the number of outbound instructions and inbound instructions, determine the ratio of outbound instructions based on the number of outbound instructions and the total number of instructions sent, and determine the ratio of inbound instructions based on the inbound instructions and the total number of sent instructions.

Step 630, determining a ratio compliance degree based on the goods ratio and the ratio of outbound instructions in response to a target position being a row and a column of a shelf or determining the ratio compliance degree based on a vacancy ratio and an ratio of inbound instructions in response to the target position being a pickup table.

The ratio compliance degree refers to the compliance degree between the goods ratio in the target shelf and the ratio of outbound instructions sent by the management platform in the historical time period, or the compliance degree between the vacancy ratio in the target shelf and the ratio of inbound instructions sent by the management platform in the historical time period. For example, if the goods ratio is 90% and the ratio of outbound instructions is 80%, which may be considered that the probability of the next instruction being an outbound instruction is high, therefore the ratio compliance degree is high. As another example, if the goods ratio is 80% and the ratio of outbound instructions is 10%, the next instruction may be more likely to be outbound in terms of the goods ratio, and the next instruction may be more likely to be inbound in terms of an instruction ratio, and at this time, it is difficult to judge whether the next instruction is more likely to be an outbound instruction or an inbound instruction, so the ratio compliance degree may be lower.

In some embodiments, in response to the target position being a row or a column of a shelf, the management platform may determine the ratio compliance degree based on the goods ratio, the ratio of outbound instructions, the vacancy ratio, and the ratio of inbound instruction. For example, the ratio compliance degree may be calculated through the following formula (8):

$$e = a_c b_c \qquad (8).$$

Wherein, e is the ratio compliance degree, $a_c$ is the goods ratio of the shelf corresponding to the target position, $b_c$ is the ratio of outbound instructions sent by the management platform in the historical period.

In some embodiments, in response to the target position being a pickup station, the management platform may determine the ratio compliance degree based on the vacancy ratio and the ratio of inbound instructions. For example, the ratio compliance degree may be calculated through the following formula (9):

$$e = a_d b_d \qquad (9).$$

Wherein, e is the ratio compliance degree, $a_d$ is the vacancy ratio of the three-dimensional warehouse, $b_d$ is the ratio of inbound instruction sent by the management platform in the historical period.

step 640, determining the movement reward value based on the ratio compliance degree.

In some embodiments, the management platform may determine the movement reward value based on the ratio compliance degree and the first accuracy. For example, the movement reward value may be calculated by the following formula (10):

$$r_m = k_1 \overline{c} \frac{p_b}{p_a} + k_2 e. \qquad (10)$$

Wherein, $r_m$ is the movement reward value, e is the ratio compliance degree, C is the first accuracy, $p_a$ is the total number of instructions sent by the management platform in the historical time period, $p_b$ is the number of times the target position is specified as the pickup position of the instruction in the historical time period, $k_1$ and $k_2$ are weight coefficients, and $k_1$ and $k_2$ may be determined based on experience, for example, $k_1$ may be 10, $k_2$ may be 5.

In some embodiments of the present disclosure, the movement reward value is determined by introducing the ratio compliance degree, which not only considers the relevant information of the automatic stacker itself, but also considers the goods ratio, ratio of outbound and inbound instructions of the three-dimensional warehouse, and other information, so that the reinforcement learning model may learn the relevant information of the three-dimensional warehouse to more accurately determine the target standby position of the automatic stacker.

The basic concepts have been described above, obviously, for those skilled in the art, the above detailed disclosure is merely a way of example, which does not constitute a limitation of the present specification. Although there is no clear explanation here, those skilled in the art may make various modifications, improvements, and corrections for the present disclosure. This class of modification, improvement, and corrections are recommended in present disclosure, so this class is modified, improved, and the amendment remains in the spirit and scope of the exemplary embodiment of the present disclosure.

Meanwhile, the present disclosure uses specific words to describe embodiments of the present specification. As "one embodiment," "an embodiment," and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not used to define the instruction of the present specification processes and methods. Although some embodiments of the invention currently considered useful have been discussed through various examples in the above disclosure, it should be understood that such details are only for illustration, and the additional claims are not limited to the disclosed embodiments. On the contrary, the claims are intended to cover all amendments and equivalent combinations in line with the essence and scope of the embodiments of the specification. For example, although the implementation of various components described above may be embodied in a hardware device, it may also be implemented as a software only solution, e.g., an installation on an existing server or mobile device.

Similarly, it should be noted that in instruction to simplify the expression disclosed in the present disclosure and help the understanding of one or more invention embodiments, in the previous description of the embodiments of the present disclosure, a variety of features are sometimes combined into one embodiment, drawings or description thereof. However, the present disclosure method does not mean that the features needed in the spectrum ratio of this disclosure ratio are more characteristic. Actually, the features of embodiments matter may lie in less than all features of a single foregoing disclosed embodiment.

In some embodiments, the numerical parameters should be construed in light of the number of reported significant digits and by applying ordinary rounding techniques. Unless otherwise stated, "about," "approximate," or "substantially" may indicate ±20% variation of the value it describes. Correspondingly, in some embodiments, the numerical parameters used in the present disclosure and claims may be approximate values, and the approximate values may be changed according to the required characteristics of individual embodiments. In some embodiments, the numerical parameters should be construed in light of the number of reported significant digits and by applying ordinary rounding techniques. Although the numerical domains and parameters used in the present disclosure are used to confirm its range breadth, in the specific embodiment, the settings of such values are as accurate as possible within the feasible range.

For each patent, patent application, patent application publication and other materials referenced by the present disclosure, such as articles, books, instructions, publications, documentation, etc., hereby incorporated herein by reference. Except for the application history documentation of the present specification or conflict, there is also an except for documents (currently or after the present disclosure) in the widest range of documents (currently or later). It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure are intended to illustrate the principles of the embodiments of the present disclosure. Other deformations may also belong to the scope of this disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. An industrial Internet of Things for an intelligent three-dimensional warehouse, comprising user platforms, a service platform, a management platform, a sensor network platform and an object platform, the user platforms, the service platform, the management platform, the sensor network platform and the object platform interacting in sequence and arranged from top to bottom sequentially; wherein the service platform adopts an independent arrangement, and both the management platform and the sensor network platform adopt a front-sub-platform arrangement; the service platform includes a plurality of independent sub-platforms, and the plurality of independent sub-platforms respectively perform data storage, data processing and/or data transmission on data of different lower platforms; each of the management platform and the sensor network platform includes a general platform and a plurality of sub-platforms, the plurality of sub-platforms respectively store and process data of different types or different receiving objects sent by the lower platform, and the one general platform stores and processes data from the plurality of sub-platforms after the data is aggregated and transmits the data to the upper platform; the object platform is configured as automatic stackers for different shelf areas in the intelligent three-dimensional warehouse;

the sub-platforms of the service platform correspond to different user platforms, a first instruction is sent by a user platform of the user platforms, and a sub-platform of the service platforms corresponding to the user platform receives the first instruction, converts the first instruction to a second instruction recognized by the management platform, and sends the second instruction to the general platform of the management platform, wherein the second instruction at least includes an instruction number, a shelf area, a number of goods to be picked and placed, and positions of goods to be picked and placed;

the general platform of the management platform receives the second instruction, extracts shelf area information in the second instruction, and sends the second instruction to the sub-platform of the management platform corresponding to the shelf area based on the shelf area information;

after receiving the second instruction, the sub-platform of the management platform extracts the instruction number, the shelf area, the number of goods to be picked and placed, and the positions of goods to be picked and placed, converts them to a third instruction recognized by the automatic stacker, and sends the shelf area information and the third instruction to the general platform of the sensor network platform;

after receiving the shelf area information and the third instruction, the general platform of the sensor network platform sends the third instruction to a sub-platform of the sensor network platform corresponding to the shelf area based on the shelf area information; and the sub-platform of the sensor network platform receives the third instruction and sends the third instruction to one or more automatic stackers corresponding thereto, and the one or more automatic stackers pick and place the goods based on the third instruction and feed data of the goods pick and place results back;

wherein the management platform is configured to perform the following operations comprising:

in response to receiving the second instruction from the service platform, determining whether a moving force of an automatic stacker satisfies an execution condition, wherein the second instruction is determined by the service platform based on the first instruction sent by the user platform of the user platforms, and the first instruction includes a goods retrieval instruction;

controlling the automatic stacker to execute a pick-and-place operation in response to the moving force of the automatic stacker satisfying the execution condition; and in response to the automatic stacker completing the pick-and-place operation, determining a target standby position, and controlling the automatic stacker to move to the target standby position.

2. The industrial Internet of Things for intelligent three-dimensional warehouse of claim 1, wherein when receiving the first instruction, the sub-platform of the service platform at least extracts the instruction number, the shelf area, the number of the goods to be picked and placed and the positions of the goods to be picked and placed of the first instruction;

the sub-platform of the service platform sequentially compiles the instruction number, the shelf area, the number of the goods to be picked and placed, and the positions of the goods to be picked and placed into corresponding data codes, and finally, makes all data codes formed into a data code set according to a compilation rule; and the sub-platform of the service platform converts the data code set into the second instruction recognized by the management platform and sends the second instruction to the general platform of the management platform.

3. The industrial Internet of Things for intelligent three-dimensional warehouse of claim 1, wherein the general platform of the management platform pre-stores an association table of the shelf area information, and the association table of the shelf area information at least includes the shelf area and the corresponding sub-platform of the management platform;

after receiving the second instruction, the general platform of the management platform extracts the shelf area information of the second instruction, and identifies the sub-platform of the management platform corresponding to the shelf area based on the shelf area information; and the general platform of the management platform sends the second instruction to a corresponding target platform.

4. The industrial Internet of Things for intelligent three-dimensional warehouse of claim 1, wherein after receiving the shelf area information and the third instruction, the general platform of the sensor network platform first extracts the shelf area information and finds out the sub-platform of the sensor network platform corresponding to the shelf area based on the shelf area information; and the general platform of the sensor network platform sends the third instruction to the sub-platform of the sensor network platform corresponding to the shelf area.

5. The industrial Internet of Things for intelligent three-dimensional warehouse of claim 4, wherein when extracting a plurality of shelf area information, the general platform of the sensor network platform sequentially finds out sub-platforms of the sensor network platform corresponding to a plurality of shelf areas, and sends the third instruction to all found sub-platforms of the sensor network platform.

6. The industrial Internet of Things for intelligent three-dimensional warehouse of claim 1, wherein when the third instruction further includes execution moment data, the one or more automatic stackers, after receiving the third instruction, read the execution moment data and execute the third instruction at an execution moment.

7. The industrial Internet of Things for intelligent three-dimensional warehouse of claim 1, wherein after one or more automatic stackers feed data of the goods pick and place result back, the data of the goods pick and place result is sent to the all sub-platforms of the service platform through the sensor network platform and the management platform;

a goods data table is stored in the all sub-platforms of the service platform, and corresponds to a number of all goods and storage positions of the all goods of all pickup areas;

after obtaining the data of the goods pick and place result, the sub-platform of the service platform reads the data of the goods pick and place result, obtains the number of goods to be picked and placed and the positions of goods to be picked and placed based on the goods pick and place data, and updates the goods data table, and before the user platform sends the first instruction, the corresponding sub-platform of the service platform sends the goods data table to the user platform, and the user platform consults goods data and send the first instruction based on the goods data table.

8. The industrial Internet of Things for intelligent three-dimensional warehouse of claim 1, wherein the target standby position is determined based on a reinforcement learning model; an action executed by an automatic stacker of the reinforcement learning model includes: remaining static and moving to a target position;

a reward value of the automatic stacker performing the static action is related to an idle duration and a moving length within an idle period; and a reward value of the automatic stacker performing the action of moving to the target position is related to an expected movement value of moving to the target position.

9. The industrial Internet of Things for intelligent three-dimensional warehouse of claim 8, wherein the expected movement value relates to a movement reward value and a movement penalty value.

10. The industrial Internet of Things for intelligent three-dimensional warehouse of claim 9, wherein the movement reward value relates to a first accuracy.

11. The industrial Internet of Things for intelligent three-dimensional warehouse of claim 9, wherein the movement reward value further relates to a ratio compliance degree.

12. A controlling method of an industrial Internet of Things for intelligent three-dimensional warehouse, wherein the industrial Internet of Things further comprises: user platforms, a service platform, a management platform, a sensor network platform, and an object platform interacting in sequence and arranged from top to bottom sequentially;

wherein the service platform adopts an independent arrangement, and both the management platform and the sensor network platform adopt a front-sub-platform arrangement; the service platform includes a plurality of independent sub-platforms, and the plurality of independent sub-platforms respectively perform data storage, data processing and/or data transmission on data of different lower platforms; each of the management platform and the sensor network platform includes one general platform and a plurality of sub-platforms, the plurality of sub-platforms respectively store and process data of different types or different receiving objects sent by the lower platform, and the one general platform stores and processes data from the plurality of sub-platforms after the data is aggregated and transmits the data to the upper platform; the object platform is configured as automatic stackers for different shelf areas in the intelligent three-dimensional warehouse;

wherein the controlling method comprises:

by a sub-platform of the service platform corresponding to the user platform, receiving the first instruction, converting the first instruction to the second instruction recognized by the management platform, and sending the second instruction to the general platform of the management platform, wherein the sub-platforms of the service platform correspond to different user platforms, the first instruction is sent by a user platform of the user platforms, the second instruction at least includes an instruction number, a shelf area, a number of goods to be picked and placed, and positions of goods to be picked and placed;

by the general platform of the management platform, receiving the second instruction, extracting shelf area information in the second instruction, and sending the second instruction to the sub-platform of the management platform corresponding to the shelf area based on the shelf area information;

after receiving the second instruction, by the sub-platform of the management platform, extracting the instruction number, the shelf area, the number of goods to be picked and placed, and the position of goods to be picked and placed to a third instruction recognized by the automatic stacker and sending the shelf area information and the third instruction to the general platform of the sensor network platform;

after receiving the shelf area information and the third instruction, by the general platform of the sensor network platform, sending the third instruction to a sub-platform of the sensor network platform corresponding to the shelf area based on the shelf area information; and by the sub-platform of the sensor network platform, receiving the third instruction and sending the third instruction to one or more automatic stackers corresponding thereto, wherein the one or more automatic stackers pick and place the goods based on the third instruction and feed data of the goods to be picked and placed results back.

13. The controlling method of the Industrial Internet of Things for intelligent three-dimensional warehouse of claim 12, wherein by a sub-platform of the service platform corresponding to the user platform, receiving the first instruction, converting the first instruction to the second instruction recognized by the management platform, and sending the second instruction to the general platform of the management platform further includes:

when receiving the first instruction, by the sub-platform of the service platform, at least extracting the instruction number, the shelf area, the number and positions of the goods to be picked and placed of the first instruction;

by the sub-platform of the service platform, sequentially complying the instruction number, the shelf area, the number of the goods to be picked and placed, and the positions of the goods to be picked and placed into corresponding data codes, and finally, making all data codes formed into a data code set according to a compilation rule; and converting the data code set into the second instruction recognized by the management platform and sending the second instruction to the general platform of the management platform.

14. The controlling method of the industrial Internet of Things for intelligent three-dimensional warehousess of claim 12, wherein by the general platform of the management platform, receiving the second instruction, extracting shelf area information in the second instruction, and sending the second instruction to the sub-platform of the management platform corresponding to the shelf area based on the shelf area information further includes:

by the general platform of the management platform, pre-storing an association table of the shelf area information, and the association table of the shelf area information at least including the shelf area and the corresponding sub-platform of the management platform;

after receiving the second instruction, by the general platform of the management platform, extracting the shelf area information of the second instruction, and identifying the sub-platform of the management platform corresponding to the shelf area based on the shelf area information; and by the general platform of the management platform, sending the second instruction to a corresponding target platform.

15. The controlling method the industrial Internet of Things for intelligent three-dimensional warehousess of claim 12, wherein after receiving the shelf area information and the third instruction, by the general platform of the sensor network platform, sending the third instruction to a sub-platform of the sensor network platform corresponding to the shelf area based on the shelf area information further includes:

after receiving the shelf area information and the third instruction, by the general platform of the sensor network platform, first extracting the shelf area information and finding out the sub-platform of the sensor network platform corresponding to the shelf area based on the shelf area information; and by the general platform of the sensor network platform, sending the third instruction to the sub-platform of the sensor network platform corresponding to the shelf area.

16. The controlling method of the industrial Internet of Things for intelligent three-dimensional warehouse of claim 15, wherein when extracting a plurality of shelf area information, the general platform of the sensor network platform sequentially finds out sub-platforms of the sensor network platform corresponding to the plurality of shelf areas, and sending the third instruction to all found sub-platforms of the sensor network platform.

17. The controlling method of the industrial Internet of Things for intelligent three-dimensional warehouse of claim 12, wherein when the third instruction further includes execution moment data, the one or more automatic stackers, after receiving the third instruction, read the execution moment data and execute the third instruction at an execution moment.

18. The controlling method of the industrial Internet of Things for intelligent three-dimensional warehouse of claim 12, wherein after one or more automatic stackers feed the data of the goods pick and place result back, the data of the goods pick and place result is sent to all sub-platforms of the service platform through the sensor network platform and the management platform;

a goods data table is stored in the sub-platforms of all service platforms, and corresponds to a number of all goods and storage positions of the all goods of all pickup areas;

after obtaining the data of the goods pick and place result, the sub-platform of the service platform, reads the data of goods pick and place result, obtains the number of goods to be picked and placed and positions of goods to be picked and placed based on the goods pick and place data, and updates the goods data table; and before the user platform sends the first instruction, the corresponding sub-platform of the service platform sends the goods data table to the user platform, and the user platform, consults the goods data and sends the first instruction based on the goods data table.

* * * * *